May 22, 1923.
F. G. TREUBIG
LID LIFTER
Filed April 6, 1922
1,456,157
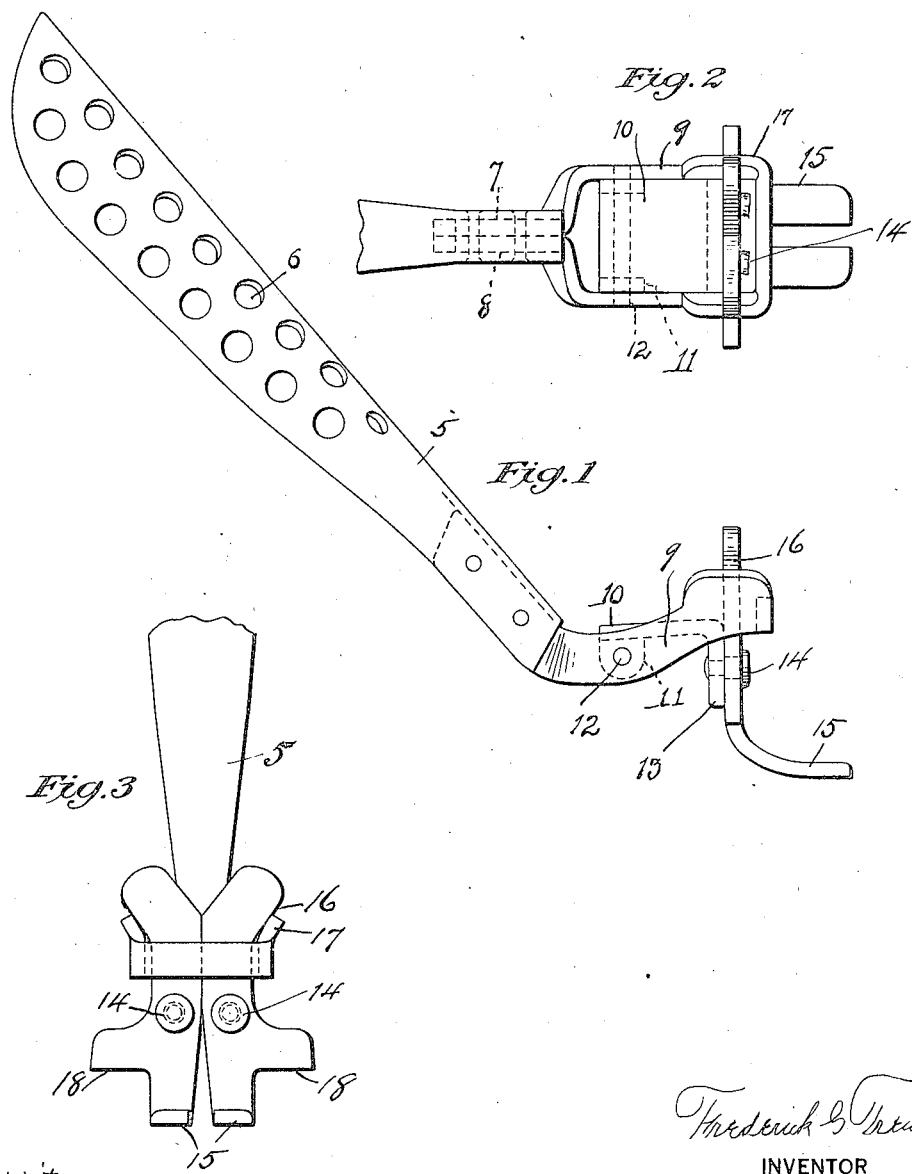
INVENTOR Patented May 22, 1923.

1,456,157

UNITED STATES PATENT OFFICE.

FREDERICK G. TREUBIG, OF OZONE PARK, NEW YORK.

LID LIFTER.

Application filed April 6, 1922. Serial No. 550,134.

*To all whom it may concern:*

Be it known that FREDERICK G. TREUBIG, a citizen of the United States, residing at No. 10410 Liberty Avenue, Ozone Park, New York, has invented certain new and useful Improvements in Lid Lifters, of which the following is a specification.

This invention relates to lid lifters, and has for an object the provision of novel means whereby a handle is so constructed as to afford free circulation of air through apertures, which circulation tends to prevent radiation of heat to the outer end of the handle and to maintain the said handle in a comparatively cool state.

It is a further object of this invention to produce a lid lifter of the character indicated in which lid engaging fingers have oscillatory motion with respect to each other in order that the lid engaging portions thereof may be spread or moved toward each other so that the said fingers will adapt themselves to the lifter socket, and thereafter move to maintain a firm hold while the lifter is being manipulated to remove the lid or to place it in position.

It is a further object of this invention to provide novel means whereby the power applied for lifting the lid is communicated to the fingers in a way to increase their gripping or engaging action on the lid, the action increasing with the increased application of power or force during the manipulation of the lid lifter.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in side elevation of a lid lifter embodying the invention;

Figure 2 illustrates a top plan view of the lid engaging end of the lifter; and

Figure 3 illustrates a front elevation thereof.

In these drawings 5 denotes a handle which is formed preferably of metal, provided with a plurality of perforations 6 of suitable size to afford free circulation of air and prevent the radiation of heat. The inner end of the handle is channeled and forms a seat for the shanks 7 and 8 of a yoke 9 which projects outwardly from the handle and constitutes a mounting for the lid engaging fingers and a means for communicating motion to the said fingers, as will presently appear.

A plate 10 has apertured ears 11, and these ears are oscillatably mounted on a pivot 12 extending through the yoke, and the said plate has an angularly disposed abutment 13 carrying studs 14 on which the lid engaging fingers are oscillatably mounted. The contour of the fingers is such that they will enter the lifting socket usually formed in lids and there is sufficient clearance between the adjacent edges of the said fingers to permit them to oscillate freely with relation to each other, it being the purpose of the inventor that the outer ends of the fingers shall approach when they are applied to the socket of a lid and that these ends be forced apart or that they be under pressure while the lifting operation is being carried on. To the end just stated, the inner ends or what might be termed the "upper" ends of the fingers project into and preferably through the yoke, and the inner ends of these fingers have oblique or beveled surfaces 16 on their outer edges that are engaged by the yoke, and through the camming action of the yoke on these beveled surfaces, the inner or upper ends of the fingers are forced together to spread the outer ends thereof, as is well shown in Fig. 3.

As a means for operating the fingers in the present embodiment of the invention, the yoke has flanges 17 which are slightly diagonal with respect to the edge of the yoke, extending as they do, outwardly in order that their side surfaces may engage the inclined or oblique edges of the fingers to act as cams for forcing the inner or upper ends of the fingers together, and as stated, this action is augmented proportional to the force or power applied during the lifting operation.

The fingers being free to oscillate will, of course, move outwardly or apart at their inner or upper ends when the yoke is swung downwardly toward the pivots or studs, thus permitting the outer ends of the fingers to approach each other when they are to be inserted in a lifter socket.

Shoulders 18 are formed by the transversely disposed projections of the fingers, and these shoulders may rest on the upper surface of the lid to prevent the lid from oscillating unduly while it is being moved.

As the functions of the elements and their cooperation with other elements of the device have been described in connection with the description of the elements, a résumé of the operation of the device is believed unnecessary to an understanding of the same by one skilled in the art.

I claim:

1. In a lid lifter, a handle, a yoke rigid with the handle, a member oscillatably mounted in the yoke, fingers pivotally connected to the member and extending above and below the yoke, the said fingers having camming outer edges adapted to engage the yoke as the yoke and member move relative to each other during the lifting operation.

2. In a lid lifter, a handle, a yoke rigid with the handle, a member oscillatably supported in the yoke, fingers oscillatably mounted on the member to swing edgewise of each other and having portions extending above the yoke and portions extending below the yoke, the portions extending above the yoke having camming edges engaging the yoke whereby those portions engaged by the yoke are forced together.

3. In a lid lifter, a handle, a yoke rigid with the handle, a member oscillatably supported in the yoke, fingers oscillatably mounted on the member to swing edgewise of each other and having portions extending above the yoke and portions extending below the yoke, the portions extending above the yoke having camming edges, flared flanges on the yoke engaging the camming edges of the fingers whereby those portions engaged by the yoke are forced together.

4. In a lid lifter, a handle, a yoke rigid with the handle, a member oscillatably supported in the yoke, fingers oscillatably mounted on the member to swing edgewise of each other and having portions extending above the yoke and portions extending below the yoke, the portions extending above the yoke having camming edges, flared flanges on the yoke engaging the camming edges of the fingers whereby those portions engaged by the yoke are forced together, and shoulders extending laterally of the fingers below the pivot.

FREDERICK G. TREUBIG.